Patented Dec. 18, 1923.

1,477,753

UNITED STATES PATENT OFFICE.

WALTER H. GREEN, OF CHICAGO, ILLINOIS.

BASE-EXCHANGE MATERIAL AND PROCESS OF PREPARING SAME.

No Drawing.   Application filed September 22, 1920.   Serial No. 412,008.

*To all whom it may concern:*

Be it known that I, WALTER H. GREEN, a citizen of the United States, residing at Chicago, in the county of Cook and State of Illinois, have invented certain new and useful improvements in Base-Exchange Materials and Processes of Preparing Same, of which the following is a specification.

This invention relates to the preparation of zeolites or base exchange silicates for technical use, the softening of water for instance, and, in particular, provides an improvement in the method of rehydrating after the materials have been conditioned by treatment with an alkali to improve or to impart the base exchanging properties, and at high temperatures to create stability which will enable them to withstand the disintegrating influences encountered in industrial practices.

There are several known methods of thus conditioning zeolitic materials. As an example reference is made to the process which forms the subject matter of the application for patent filed May 21, 1920, by Walter J. Hughes and Abraham S. Behrman, Serial No. 383,214.

The principal feature of the process claimed in the above identified application resides in the step of mixing the clayey material, before baking it, with an alkali, such as the hydroxide of sodium or potassium, whereby a much lower temperature is adequate for the subsequent drying and hardening, or baking step, and the capacity for absorbing bases in the exchange steps is appreciably increased.

I have discovered that materials, prepared according to the previous methods which subject them to combination with an alakli, can be more economically and conveniently rehydrated to adapt them for water-softening purposes by exposing the hardened particles to the action of steam. I have found that the material thus treated has a greater base exchange capacity, and is much harder, firmer and resistant to water than the particles which are rehydrated in a solution of an alkali, as heretofore. For an illustration of the method of preparing a zeolite in accordance with my present invention, I will describe the steps employed in a typical case as follows:

The substance possessing base-exchange properties, or capable of acquiring them, is treated with about 10 per cent by weight of caustic soda, in any of the several ways set forth in the said application for patent. The resultant product, if in a mass, is worked into particles of the desired size and shape, dried, and then heated or baked for ¾ hour at about 1000° F.—that is, until the desired degree of hardness is obtained. These particles are now placed in a wire basket or other receptacle and exposed to steam under a pressure of 25 pounds per square inch for 24 hours. The receptacle is so arranged and protected that no condensed steam will settle on the particles of base-exchanging material. At the end of the treatment with steam, the receptacle is removed, and the material washed with water to remove any undesirable alkali or other substances. The material is then covered with a strong solution of common salt for a number of hours, in the usual manner of regenerating base-exchanging substances. This brine is subsequently washed out, the zeolite then being in condition for the removal of compounds of calcium and magnesium from water, which may be effected by passing the water having these compounds in solution through a bed of the zeolite.

While the above treatment is one which has given good results, it should be understood that the scope of my invention is not limited to the conditions above described. For example, in certain cases, different pressures of steam may be employed and for different periods of time; and in some cases, I have found it advantageous to leach out any contained alkali from the material after a comparatively short period of exposure to the steam under pressure, this leaching being followed by further treatment under steam pressure in the absence of the alkali.

I claim:

1. The process of treating a baked "zeolite" which comprises rehydrating it by exposing it to steam.

2. The process of treating a baked "zeolite" which comprises rehydrating it by exposing it to the action of steam under pressure, washing it and soaking it in a solution of sodium chloride.

3. The process of preparing a base exchange material, which consists in mixing an alkali with material having, or capable of acquiring, base exchange properties, heat treating the material to give it wear resisting qualities, and subjecting it to the action of steam under pressure.

4. The process of preparing a base, exchange material, which consists in combining an alkali with a clayey soil having, or capable of acquiring base exchange properties, rendering the same refractory by heat treatment and rehydrating it by exposing it to steam.

5. The process of preparing a base exchange material, which consists in mixing a suitable clayey material with an alkali, heating the mixture at a temperature of approximately 1000° F. and rehydrating by subjecting it for about 24 hours to the action of steam at approximately twenty-five pounds pressure.

6. The process of preparing a base exchange material, which consists in exposing baked particles of clayey soil mixed with an alkali to an atmosphere of steam under approximately twenty-five pounds pressure.

7. A water-softening reagent consisting of a mixture of an alkali and material, having, or capable of acquiring base exchange properties, rehydrated with steam and regenerated with sodium chloride.

8. The process of preparing base exchange silicates, which consists in mixing a suitable clayey material with an alkali, heating the mixture at a temperature of approximately 1000° F. and rehydrating by subjecting it for about 24 hours to the action of steam.

9. In the art of preparing a zeolite, a process which consists in exposing baked particles of base exchange material for considerable time in an atmosphere of steam.

10. The process of preparing a base exchange material which consists in treating material having base exchange charcteristics with an alkali, subdividing the treated material into particles, treating the particles to render them refractory, and then rehydrating the particles by exposing them to live steam.

11. The process of preparing a base exchange material for technical uses which comprises heating mineral base exchange material to render it refractory and then rehydrating it by exposing it to steam under pressure.

12. The process of conditioning base exchange silicates for use, which consists in mixing an alkali therewith, heat treating the mixture to give it wear resisting qualities, and then subjecting it to steam under pressure.

13. The process of preparing a base exchange material which consists in combining an alkali with base exchange silicate material, rendering the mixture refractory by heat treatment, and then rehydrating it by exposing it to steam.

14. The process of preparing a base exchange material, which consists in mixing an alkali with a base exchange silicate material, heating the same at a temperature of approximately 1000° F. and then rehydrating it by subjecting it for about 24 hours to the action of steam at approximately 25 pounds pressure.

15. The process of preparing base exchange material, which consists in heating a mixture of alkali and base exchange silicates, subdividing the mixture into particles, baking the particles to harden them, rehydrating the particles by subjecting them to the action of steam, and finally treating them with a salt solution.

16. The process of preparing a base exchange material, which consists in combining an alkali with base exchange silicates, heat treating the material to harden it, and rehydrating it by exposing it to steam while protected from condensed moisture.

In testimony whereof I have hereunto signed my name in the presence of two subscribing witnesses.

WALTER H. GREEN.

Witnesses:
ARTHUR M. BROCKOB,
W. J. HUGHES.